United States Patent
Yokoyama et al.

(10) Patent No.: US 12,555,037 B2
(45) Date of Patent: Feb. 17, 2026

(54) MODEL MANAGEMENT DEVICE AND MODEL MANAGING METHOD

(71) Applicant: TOYOTA JIDOSHA KABUSHIKI KAISHA, Toyota (JP)

(72) Inventors: Daiki Yokoyama, Gotemba (JP); Tomohiro Kaneko, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 775 days.

(21) Appl. No.: 17/896,290

(22) Filed: Aug. 26, 2022

(65) Prior Publication Data

US 2023/0063791 A1 Mar. 2, 2023

(30) Foreign Application Priority Data

Aug. 30, 2021 (JP) ................................. 2021-139830

(51) Int. Cl.
*G06N 20/00* (2019.01)
*G06F 1/3206* (2019.01)
(Continued)

(52) U.S. Cl.
CPC .......... *G06N 20/00* (2019.01); *G06F 1/3206* (2013.01); *G06F 9/5055* (2013.01); *G06N 3/06* (2013.01);
(Continued)

(58) Field of Classification Search
CPC ........ G06N 20/00; G06N 3/06; G06N 3/0985; G06N 3/084; G06F 1/3206; G06F 1/324;
(Continued)

(56) References Cited

U.S. PATENT DOCUMENTS 10,810,512 B1* 10/2020 Wubbels ................ G06N 20/00
11,804,050 B1 10/2023 Milletari et al.
(Continued)

FOREIGN PATENT DOCUMENTS

| CN | 112749729 A | 5/2021 |
|---|---|---|
| JP | H05-282281 A | 10/1993 |
| JP | 2013-069084 A | 4/2013 |

OTHER PUBLICATIONS

Qu, W., Ding, X., Yang, K., Bao, Y., & Chen, W. (2020, December). IDEC: Intelligent distributed edge computing system architecture enabling deep learning across heterogeneous IoT devices. In 2020 IEEE 6th International Conference on Computer and Communications (ICCC) (pp. 926-933). IEEE. (Year: 2020).*

(Continued)

*Primary Examiner* — Andrew L Tank
(74) *Attorney, Agent, or Firm* — Dinsmore & Shohl LLP

(57) ABSTRACT

The model management device includes a communication unit capable of communicating with a plurality of AI devices, each of which continuously performs training of a machine learning model, and a processor configured to manage training of a machine learning model in each of the plurality of AI devices, and acquire accuracy of the machine learning model trained in each of the plurality of AI devices. The processor is configured to change an execution frequency of a process relating to training of the machine learning model having an accuracy within a predetermined range.

10 Claims, 13 Drawing Sheets

(51) Int. Cl.
| | |
|---|---|
| *G06F 9/50* | (2006.01) |
| *G06N 3/06* | (2006.01) |
| *G06N 3/084* | (2023.01) |
| *G06N 3/0985* | (2023.01) |
| *H04W 52/02* | (2009.01) |

(52) U.S. Cl.
CPC ........... *G06N 3/084* (2013.01); *G06N 3/0985* (2023.01); *H04W 52/0261* (2013.01)

(58) Field of Classification Search
CPC . G06F 1/3234; G06F 9/5055; H04W 52/0261
See application file for complete search history.

(56) References Cited

U.S. PATENT DOCUMENTS

| | | | |
|---|---|---|---|
| 11,929,888 B2* | 3/2024 | Bernat | G06F 1/28 |
| 2016/0064940 A1* | 3/2016 | De La Cropte De Chanterac | G06F 1/3212 307/31 |
| 2019/0086988 A1* | 3/2019 | He | G06F 1/3212 |
| 2019/0104480 A1* | 4/2019 | Hasholzner | G06F 1/324 |
| 2019/0156178 A1* | 5/2019 | Thornton | G06N 3/044 |
| 2019/0156249 A1 | 5/2019 | Nakata | |
| 2019/0362235 A1* | 11/2019 | Xu | G06N 3/04 |
| 2020/0160207 A1* | 5/2020 | Song | G06F 11/3466 |
| 2020/0401891 A1 | 12/2020 | Xu et al. | |
| 2021/0232399 A1* | 7/2021 | Yang | G06F 9/5055 |
| 2021/0295174 A1* | 9/2021 | Zhang | G06N 3/082 |
| 2021/0325957 A1* | 10/2021 | Kim | G06F 1/3206 |
| 2022/0136909 A1* | 5/2022 | Kim | G06F 1/206 702/136 |
| 2022/0237415 A1* | 7/2022 | Lohia | G06F 18/2155 |

OTHER PUBLICATIONS

Chawla, N., Singh, A., Kumar, H., Kar, M., & Mukhopadhyay, S. (2020). Securing iot devices using dynamic power management: Machine learning approach. IEEE Internet of Things Journal, 8(22), 16379-16394. (Year: 2020).*

Massaoudi, M., Abu-Rub, H., Refaat, S. S., Chihi, I., & Oueslati, F. S. (2021). Deep learning in smart grid technology: A review of recent advancements and future prospects. IEEE Access, 9, 54558-54578. (Year: 2021).*

Tu, F., Wu, W., Wang, Y., Chen, H., Xiong, F., Shi, M., . . . & Yin, S. (2020). Evolver: A deep learning processor with on-device quantization-voltage-frequency tuning. IEEE Journal of Solid-State Circuits, 56(2), 658-673. (Year: 2020).*

Wang, S., Tuor, T., Salonidis, T., Leung, K. K., Makaya, C., He, T., & Chan, K. (2018, April). When edge meets learning: Adaptive control for resource-constrained distributed machine learning. In IEEE INFOCOM 2018-IEEE conference on computer communications (pp. 63-71). IEEE. (Year: 2018).*

Constantinou et al. (Sep. 2019). A crowd-based image learning framework using edge computing for smart city applications. In 2019 IEEE Fifth International Conference on Multimedia Big Data (BigMM) (pp. 11-20). IEEE. (Year: 2019).*

Cai, H., Gan, C., Zhu, L., & Han, S. (2020). Tiny transfer learning: Towards memory-efficient on-device learning. arXiv preprint arXiv:2007.11622, 3(4), 6. (Year: 2020).*

Merenda, M., Porcaro, C., & Iero, D. (2020). Edge machine learning for ai-enabled iot devices: A review. Sensors, 20(9), 2533. (Year: 2020).*

Wang, Y., He, Y., Cheng, L., Li, H., & Li, X. (2021). A fast precision tuning solution for always-on DNN accelerators. IEEE Transactions on Computer-Aided Design of Integrated Circuits and Systems, 41(5), 1236-1248. (Year: 2021).*

Yang, F., Wei, T., Huang, Y., & Feng, J. (Apr. 2021). Optimizing the Distributed Learning System with Accuracy Driven Dynamic Communication Frequency. In 2021 IEEE 6th International Conference on Cloud Computing and Big Data Analytics (ICCCBDA) (pp. 256-260). IEEE. (Year: 2021).*

Crankshaw, D et al., "The Missing Piece in Complex Analytics: Low Latency, Scalable Model Management and Serving with Velox", UC Berkeley AMPLab, 2014.

* cited by examiner

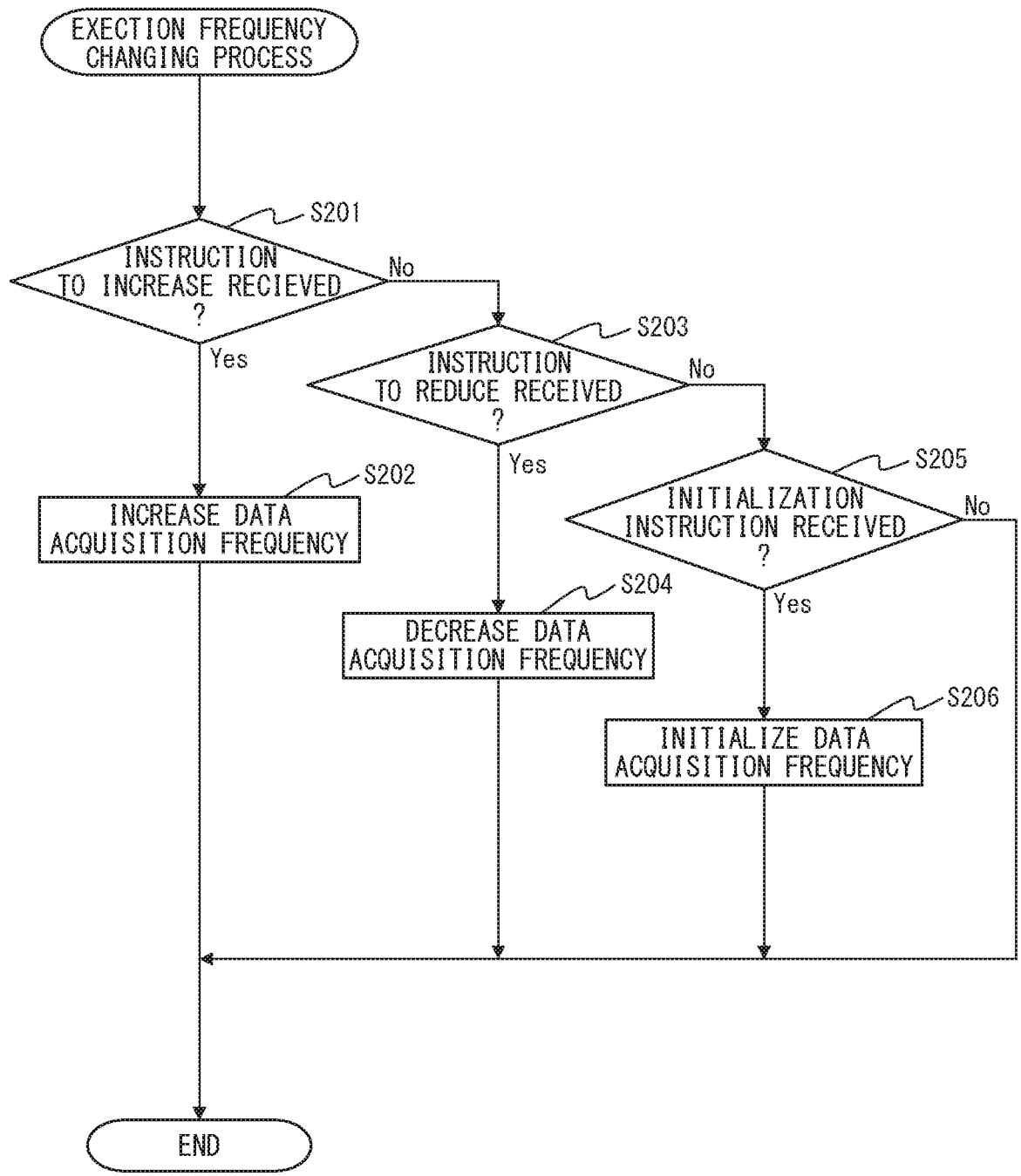

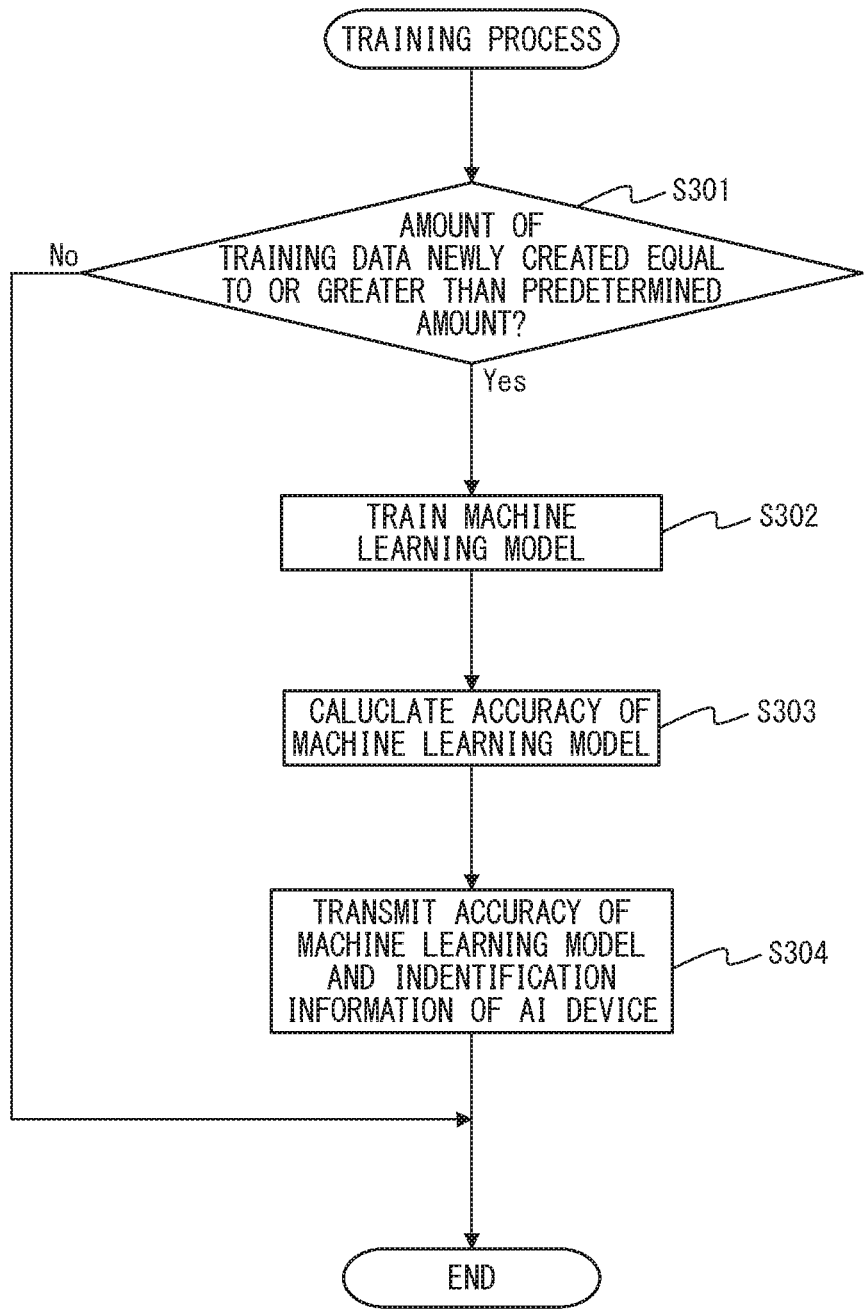

MODEL MANAGEMENT DEVICE AND MODEL MANAGING METHOD

CROSS-REFERENCE TO RELATED APPLICATION

This application claims priority to Japanese Patent Application No. 2021-139830 filed on Aug. 30, 2021, which is incorporated herein by reference in its entirety.

FIELD

The present disclosure relates to a model management device and a model management method.

BACKGROUND

Patent Document 1 describes collecting data from a plurality of business entities in a smart city. In order to make people's lives more comfortable using information and communication technology, it is desirable to be able to effectively utilize such big data.

For example, it is conceivable to train a machine learning model capable of outputting a desired predicted value by using a large amount of data acquired in a predetermined target area such as a smart city. In order to simultaneously train various types of machine learning models, a plurality of AI devices must be installed in the target areas, and training of the machine learning models must be performed in each of the plurality of AI devices.

CITATIONS LIST

Patent Literature

[PTL 1] Japanese Unexamined Patent Publication No. 2013-069084

SUMMARY

Technical Problem

However, there may be variations in the accuracy of machine learning models trained in each AI device. For example, in one machine learning model, the accuracy may be lowered due to a change in the external environment or the like, and in another machine learning model, the accuracy may be increased due to continuous training. When the accuracy of the machine learning model decreases, the reliability of the value of the output parameter output by the machine learning model decreases, which may cause problems in control, analysis, diagnosis, or the like using such a machine learning model. On the other hand, when the accuracy of the machine learning model is sufficiently high, the machine learning model becomes saturated, and continuing the training of the machine learning model at the same frequency leads to waste of power in the target area.

In view of the above problems, it is an object of the present disclosure to suppress variations in the accuracy of a machine learning model trained in each of a plurality of AI devices when each of a plurality of AI devices trains a machine learning model.

Solution to Problem

The summary of the present disclosure is as follows.

(1) A model management device for managing a plurality of machine learning models, comprising: a communication unit capable of communicating with a plurality of AI devices, each of which continuously performs training of a machine learning model; and a processor configured to manage training of the machine learning model in each of the plurality of AI devices, and acquire accuracy of the machine learning model trained in each of the plurality of AI devices, wherein the processor is configured to change an execution frequency of a process relating to training of the machine learning model having an accuracy within a predetermined range.

(2) The model management device described in above (1), wherein the processor is configured to increase the execution frequency of a process related to training of a machine learning model having an accuracy equal to or less than a predetermined lower threshold.

(3) The model management device described in above (2), wherein the processor is configured to restore the execution frequency to an original value when the accuracy of the machine learning model rises to a predetermined first determination value higher than the lower threshold due to the increase in the execution frequency.

(4) The model management device described in above any one of (1) to (3), wherein the processor is configured to reduce the execution frequency of a process related to training of a machine learning model having an accuracy equal to or higher than a predetermined upper threshold.

(5) The model management device described in above (4), wherein the processor is configured to restore the execution frequency to an original value when the accuracy of the machine learning model drops to a predetermined second determination value less than the upper threshold due to the reduction of the execution frequency.

(6) The model management device described in above any one of (1) to (5), wherein the processor is configured to increase the execution frequency of a process related to training of the machine learning model having an accuracy equal to or lower than a predetermined lower threshold, decrease the execution frequency of a process related to training of the machine learning model having an accuracy equal to or higher than a predetermined upper threshold, and change at least one of the lower threshold and the upper threshold so that a change amount of a power consumption amount due to the change of the execution frequency is equal to or less than a predetermined value.

(7) The model management device described in above any one of (1) to (5), wherein the processor is configured to acquire an amount of power that can be supplied to the plurality of AI devices, and the processor is configured to increase the execution frequency of a process related to training of the machine learning model having an accuracy of a predetermined lower threshold or less, decrease the execution frequency of a process related to training of the machine learning model having an accuracy of a predetermined upper threshold or more, and change at least one of the upper threshold and the lower threshold based on the amount of power.

(8) The model management device described in above any one of (4) to (7), wherein the machine learning model having an accuracy equal to or higher than the upper threshold is a machine learning model that does not output data related to human health.

(9) A model management method for managing a plurality of machine learning models using a model management device, comprising: acquiring an accuracy of a machine learning model trained in each of a plurality of AI devices;

and changing an execution frequency of a process related to training of the machine learning model having an accuracy within a predetermined range.

According to the present disclosure, it is possible to suppress variations in the accuracy of a machine learning model trained in each of a plurality of AI devices when each of a plurality of AI devices perform training of a machine learning model.

BRIEF DESCRIPTION OF DRAWINGS

FIG. 7 is a flow chart showing control routines of the execution frequency changing process executed in the AI device.

FIG. 8 is a flowchart illustrating a control routine for a training process performed in an AI device.

DESCRIPTION OF EMBODIMENTS

Figure 1:
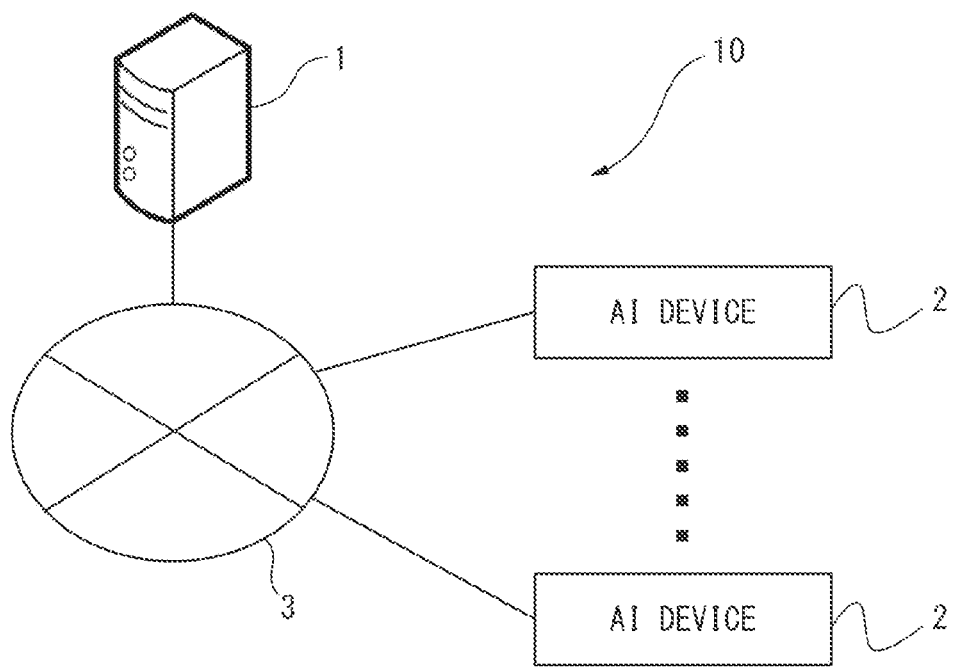
FIG. 1 is a schematic configuration diagram of a model management system according to a first embodiment of the present disclosure.

Hereinafter, embodiments of the present disclosure will be described in detail with reference to the drawings. In the following description, like components are denoted by the same reference numerals.

First Embodiment

First, a first embodiment of the present disclosure will be described with reference to FIGS. 1 to 8.

FIG. 1 is a schematic configuration diagram of a model management system 10 according to a first embodiment of the present disclosure. As shown in FIG. 1, the model management system 10 includes a management server 1 and a plurality of AI devices 2. The plurality of AI devices 2 can communicate with the management server 1 via a communication network 3, such as an Internet or carrier network, respectively.

Each of the plurality of AI devices 2 is installed in a predetermined target area, and performs training of machine learning models used in the target area. The predetermined target area has a predetermined range, and is, for example, a smart city defined as "a sustainable city or district in which management (planning, maintenance, management, operation, etc.) is performed while utilizing new technologies such as ICT (Information and Communication Technology) for various problems of cities, and overall optimization is achieved".

The AI device is also referred to as machine learning device.

Figure 2:
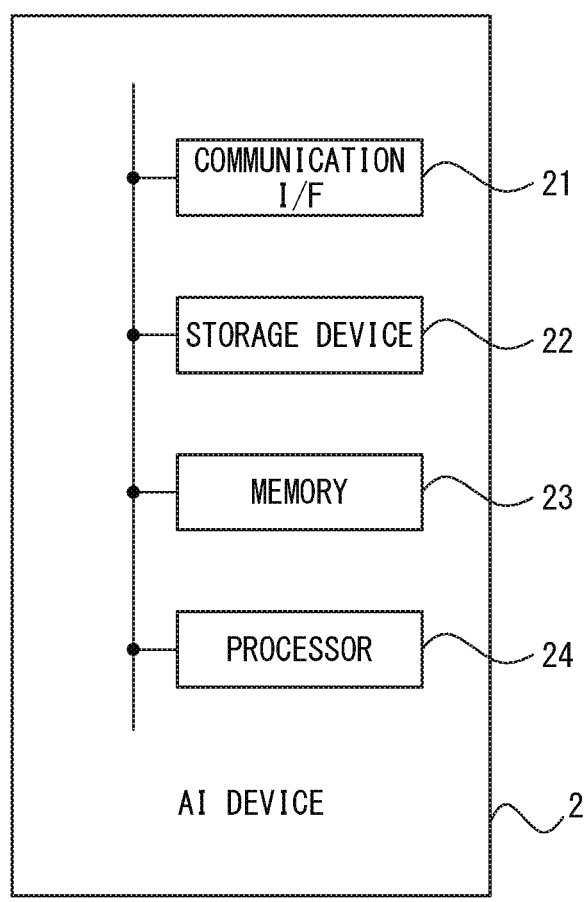
FIG. 2 is a diagram schematically showing a configuration of the AI device of FIG. 1.

The plurality of AI devices 2 have a similar configuration. FIG. 2 is a diagram schematically showing a configuration of the AI device 2 of FIG. 1. The AI device 2 includes a communication interface 21, a storage device 22, a memory 23, and a processor 24. The communication interface 21, storage device 22, and memory 23 are connected to the processor 24 via signal lines. The AI device 2 may further include an input device such as a keyboard and a mouse, an output device such as a display, and the like. The AI device 2 may be composed of a plurality of computers.

The communication interface 21 has interface circuits for connecting the AI device 2 to the communication network 3. The AI device 2 is connected to the communication network 3 via the communication interface 21 and communicates with the outside of the AI device 2 (e.g., the management server 1) via the communication network 3. The communication interface 21 is an exemplary communication unit of the AI device 2.

The storage device 22 includes, for example, a hard disk drive (HDD), a solid-state drive (SDD), or an optical recording medium and its accessing device. The storage device 22 stores various kinds of data, for example, information of the AI device 2 (identification information, etc.), a computer program for the processor 24 to execute various kinds of processing, and the like. The storage device 22 is an example of a storage unit of the AI device 2.

The memory 23 includes a nonvolatile semiconductor memory such as RAM. The memory 23 temporarily stores, for example, various data used when various processing is executed by the processor 24. Memory 23 is another example of a storage portion of AI device 2.

The processor 24 includes one or a plurality of CPUs and peripheral circuits thereof, and executes various processes. It should be noted that the processor 24 may further include other arithmetic circuits, such as a logical arithmetic unit, a numerical arithmetic unit, or a graphic processing unit.

Figure 3:
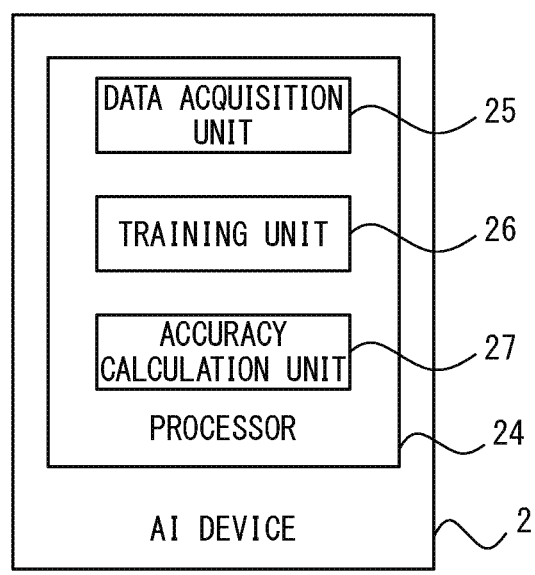
FIG. 3 is a functional block diagram of a processor of the AI device.

FIG. 3 is a functional diagram of the processor 24 of the AI device 2. In the present embodiment, the processor 24 includes a data acquisition unit 25, a training unit 26, and an accuracy calculation unit 27. The data acquisition unit 25, the training unit 26, and the accuracy calculation unit 27 are functional modules realized by the processor 24 of the AI device 2 executing computer programs stored in the storage device 22 of the AI device 2. Each of these functional modules may be realized by a dedicated arithmetic circuit provided in the processor 24.

The machine learning models trained in the AI device 2 output at least one output parameter from a plurality of input parameters. That is, the AI device 2 causes the machine learning model to output at least one output parameter by inputting a plurality of input parameters to the machine learning model. In the training of the machine learning model, training data (teacher data) composed of a combination of measured values of a plurality of input parameters and measured values (correct answer data) of at least one output parameter corresponding to the measured values is used.

For this reason, the data acquisition unit 25 receives data from a sensor or the like by wired communication or wireless communication, and creates training data used for training the machine learning model. More specifically, the data acquisition unit 25 extracts the measured values of the plurality of input parameters and the measured values of at least one output parameter corresponding to the measured values from the acquired data, and creates training data by combining the measured values of the input parameters and the output parameter. The training data created by the data acquisition unit 25 is stored in the storage device 22 of the AI device 2.

The training unit 26 uses the training data to train the machine learning model. In the present embodiment, a neural network model is used as the machine learning model, and the training unit 26 trains the neural network model. Specifically, the training unit 26 uses a predetermined amount of training data to repeatedly update the weights and biases in the neural network model by a known error back propagation method so that the difference between the output value of the neural network model and the actually measured value of the output parameter becomes small. As a result, a neural network model is trained and a trained neural network model is generated. The trained neural network model information (weights, biases, etc.) is stored in the storage device 22 of the AI device 2.

In the present embodiment, the data acquisition unit 25 periodically acquires data to create training data, and the training unit 26 trains a machine learning model using the training data when the amount of training data newly created by the data acquisition unit 25 reaches a predetermined amount. That is, the AI device 2 continuously trains machine learning models.

In the AI device 2, the accuracy of the machine learning model is monitored in order to evaluate the effectiveness of the machine learning model. Therefore, the accuracy calculation unit 27 of the AI device 2 calculates the accuracy of the machine learning model trained by the training unit 26, that is, the accuracy of the trained machine learning model generated by the AI device 2. For example, the data acquisition unit 25 generates training data and test data from the acquired data, and the accuracy calculation unit 27 calculates the accuracy of the machine learning model by a known verification method such as a hold-out method or a cross validation method.

On the other hand, the management server 1 manages a plurality of machine learning models by communicating with a plurality of AI devices 2. The management server 1 is an exemplary model management device for managing a plurality of machine learning models.

Figure 4:
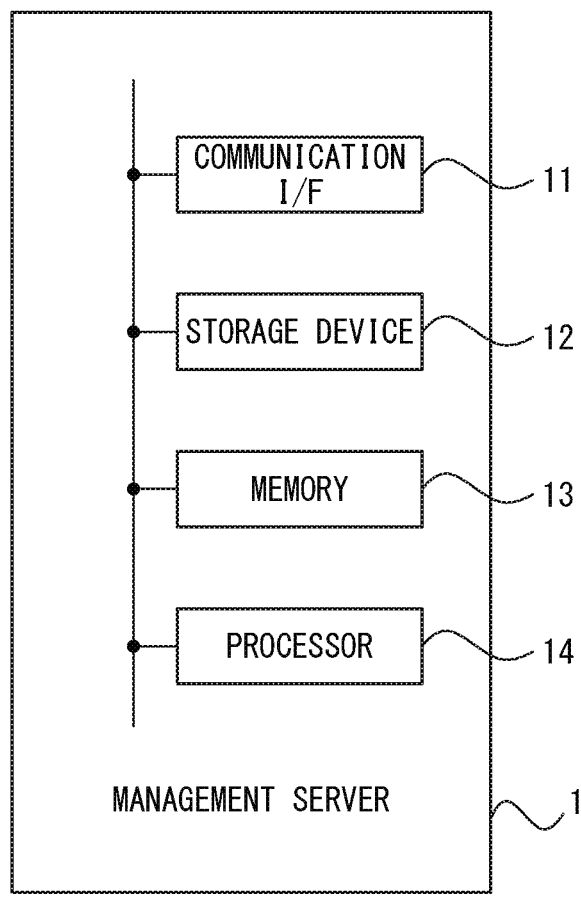
FIG. 4 is a diagram schematically showing a configuration of the management server shown in FIG. 1.

FIG. 4 is a diagram schematically showing a configuration of the management server 1 of FIG. 1. The management server 1 includes a communication interface 11, a storage device 12, a memory 13, and a processor 14. The communication interface 11, the storage device 12, and the memory 13 are connected to the processor 14 via signal lines. The management server 1 may further include an input device such as a keyboard and a mouse, an output device such as a display, and the like. The management server 1 may be composed of a plurality of computers.

The communication interface 11 has an interface circuit for connecting the management server 1 to the communication network 3. The management server 1 is connected to the communication network 3 via the communication interface 11 and communicates with the outside of the management server 1 (a plurality of AI device 2 and the like) via the communication network 3.

The communication interface 11 is an example of a communication unit of the management server 1.

The storage device 12 includes, for example, a hard disk drive (HDD), a solid-state drive (SDD), or an optical recording medium and its accessing device. The storage device 12 stores various kinds of data, for example, information of the AI device 2 (identification information, etc.), a computer program for the processor 14 to execute various kinds of processing, and the like.

Storage device 12 is an example of a storage unit of the management server 1.

The memory 13 includes a nonvolatile semiconductor memory such as RAM. The memory 13 temporarily stores, for example, various data used when various processing is executed by the processor 14. Memory 13 is another example of a storage unit of the management server 1.

The processor 14 includes one or a plurality of CPUs and peripheral circuits thereof, and executes various processes. It should be noted that the processor 14 may further include other arithmetic circuits such as a logical arithmetic unit, a numerical arithmetic unit, or a graphic processing unit.

Figure 5:
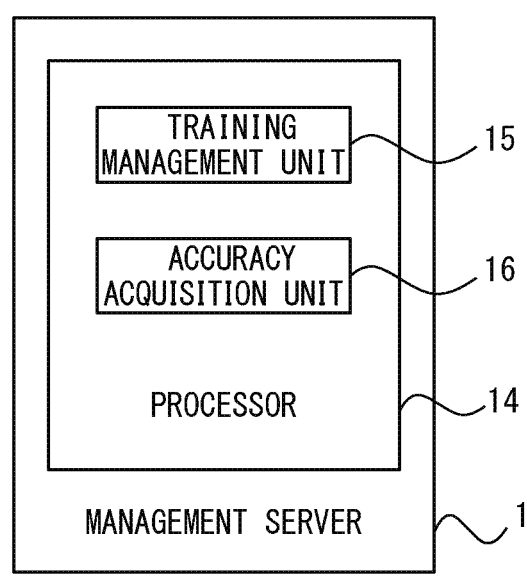
FIG. 5 is a functional block diagram of a processor of the management server according to the first embodiment.

FIG. 5 is a functional block diagram of the processor 14 of the management server 1 according to the first embodiment. In the present embodiment, the processor 14 includes a training management unit 15 and an accuracy acquisition unit 16. The training management unit 15 and the accuracy acquisition unit 16 are functional modules implemented by executing a computer program stored in the storage device 12 of the management server 1 by the processor 14 of the management server 1. Each of these functional modules may be realized by a dedicated arithmetic circuit provided in the processor 14.

The training management unit 15 manages training of machine learning models in each of the AI devices 2. For example, the training management unit 15 determines the execution frequency of the process related to the training of the machine learning models, and notifies each AI device 2 of the execution frequency. The accuracy acquisition unit 16 acquires the accuracy of the machine learning model trained in each of the plurality of AI devices 2.

Even if the training of the machine learning model is continuously performed in AI device 2 as described above, there may be variations in the accuracy of the machine learning model depending on the combination of the input parameters and the output parameters of the machine learning model. For example, in one machine learning model, the accuracy may be lowered due to a change in the external environment or the like, and in another machine learning model, the accuracy may be increased due to continuous training. When the accuracy of the machine learning model decreases, the reliability of the value of the output parameter output by the machine learning model decreases, which may cause problems in control, analysis, diagnosis, or the like using such a machine learning model. On the other hand, when the accuracy of the machine learning model is sufficiently high, the machine learning model becomes saturated, and continuing the training of the machine learning model at the same frequency leads to waste of power in the target area.

Therefore, in the present embodiment, the management server 1 collectively manages training of a plurality of machine learning models in a plurality of AI devices 2 so that variations in the accuracy of the machine learning models are reduced. Specifically, the training management unit 15 changes the execution frequency of the process related to the training of the machine learning model having an accuracy within a predetermined range. That is, when the accuracy of the machine learning model trained in the AI device 2 is within a predetermined range, the training management unit 15 instructs the AI device 2 to change the execution frequency of the process related to the training of the machine learning model. As a result, it is possible to suppress variations in the accuracy of the machine learning models trained in each of the plurality of AI devices 2.

For example, the training management unit 15 increases the execution frequency of a process related to training of the machine learning model having an accuracy of a predetermined lower threshold or less. That is, when the accuracy of the machine learning model trained in the AI device 2 is equal to or less than a predetermined lower threshold, the training management unit 15 instructs the AI device 2 to increase the execution frequency of the process related to the training of the machine learning model. This makes it possible to promote training of the machine learning model in which the accuracy is insufficient, and to suppress the deterioration of the accuracy due to the insufficiency of the training frequency.

However, if the accuracy of the machine learning model is sufficiently increased by increasing the training frequency, it is not necessary to continue the high-frequency training. Therefore, when the accuracy of the machine learning model rises to a predetermined first determination value higher than the lower threshold due to an increase in the execution frequency of the process related to training, the training management unit 15 returns the execution frequency of the process related to training to the original state. By this, it is possible to suppress that power that is wasted by excessive training of the machine learning model, while maintaining the accuracy of the machine learning model.

Further, the training management unit 15 decreases the execution frequency of processing related to the training of the machine learning model having the accuracy of a predetermined upper threshold or more. That is, when the accuracy of the machine learning model trained in the AI device 2 is equal to or higher than a predetermined upper threshold, the training management unit 15 instructs the AI device 2 to reduce the execution frequency of the process related to the training of the machine learning model. By this, it is possible to suppress the training of the machine learning model with sufficient accuracy, and it is possible to reduce the amount of power consumption for training of the machine learning model.

However, if the accuracy of the machine learning model becomes excessively low due to a decrease in the training frequency, it is necessary to restore the accuracy of the machine learning model. Therefore, when the accuracy of the machine learning model decreases to a predetermined second determination value less than the upper threshold due to the decrease in the execution frequency of the process related to the training, the training management unit 15 returns the execution frequency of the processing related to the training to the original state. By this, it is possible to suppress the accuracy of the machine learning model from being excessively reduced while reducing the amount of power consumption for training of the machine learning model.

The process related to training in which the execution frequency is changed by the training management unit 15 is, for example, data acquisition by the data acquisition unit 25 of the AI device 2. When the training management unit 15 causes an increase in the frequency of data acquisition, the creation of training data using the acquired data is promoted, and thus the training frequency of the machine learning model is increased. On the other hand, when the training management unit 15 causes a decrease in the frequency of data acquisition, the creation of training data using the acquired data is suppressed, and thus the training frequency of the machine learning model is lowered.

The training management unit 15 may set the execution frequency to zero when decreasing the execution frequency of the process relating to the training of the machine learning model having the accuracy equal to or higher than a predetermined upper threshold. That is, the training management unit 15 may temporarily stop the processing related to the training of the machine learning model having the accuracy of a predetermined upper threshold or more.

Referring to the flowcharts of FIGS. 6 to 8, the flow of control executed in the management server 1 and the AI device 2 for the above-described process will be described below. The control routines of the diagrams 6A and 6B are executed in the management server 1, and the control routines of FIGS. 7 and 8 are executed in the AI device 2.

Figure 6A:
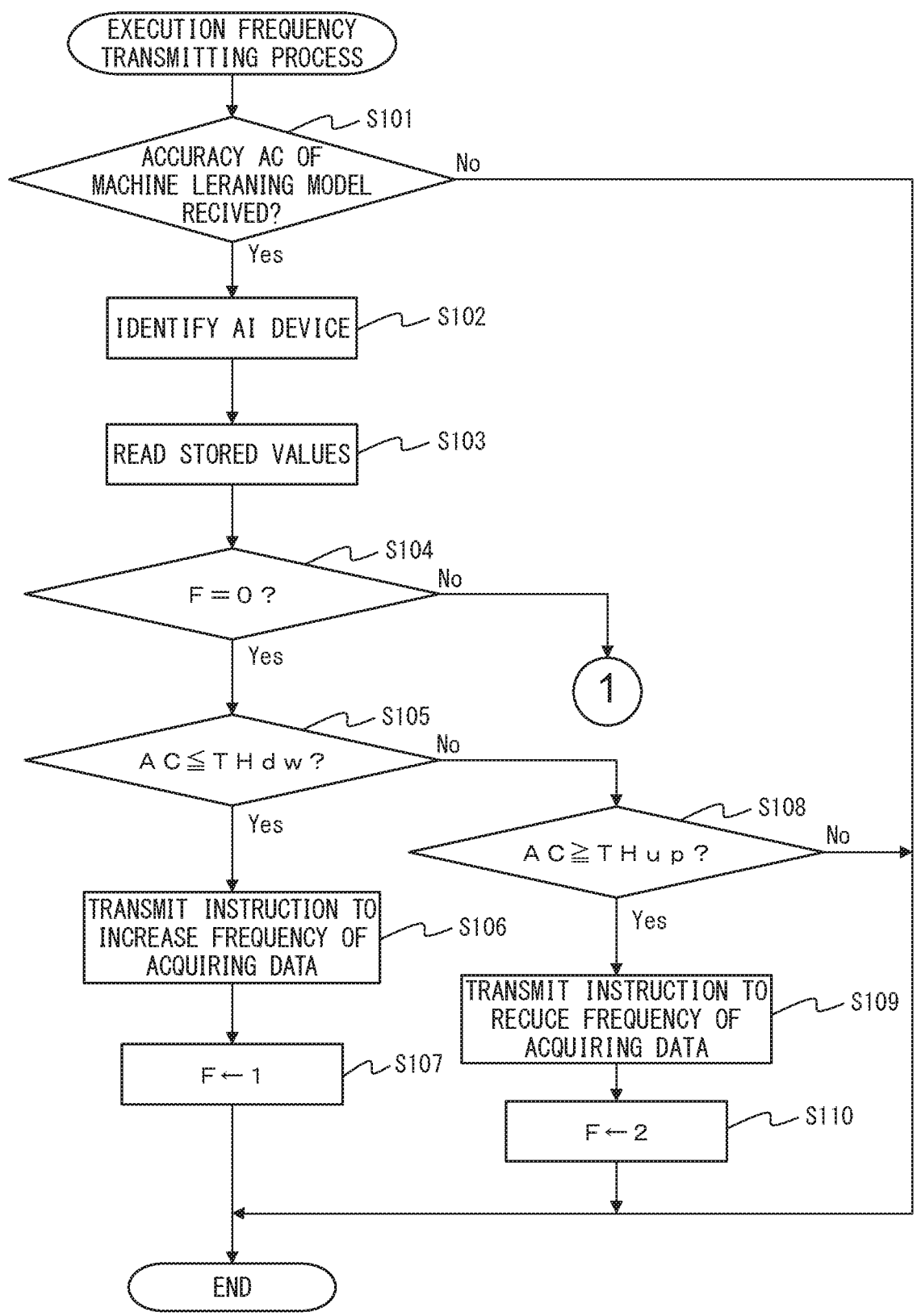
FIG. 6A is a flow chart showing control routines of the execution frequency transmitting process executed in the management servers in the first embodiment.
Figure 6B:
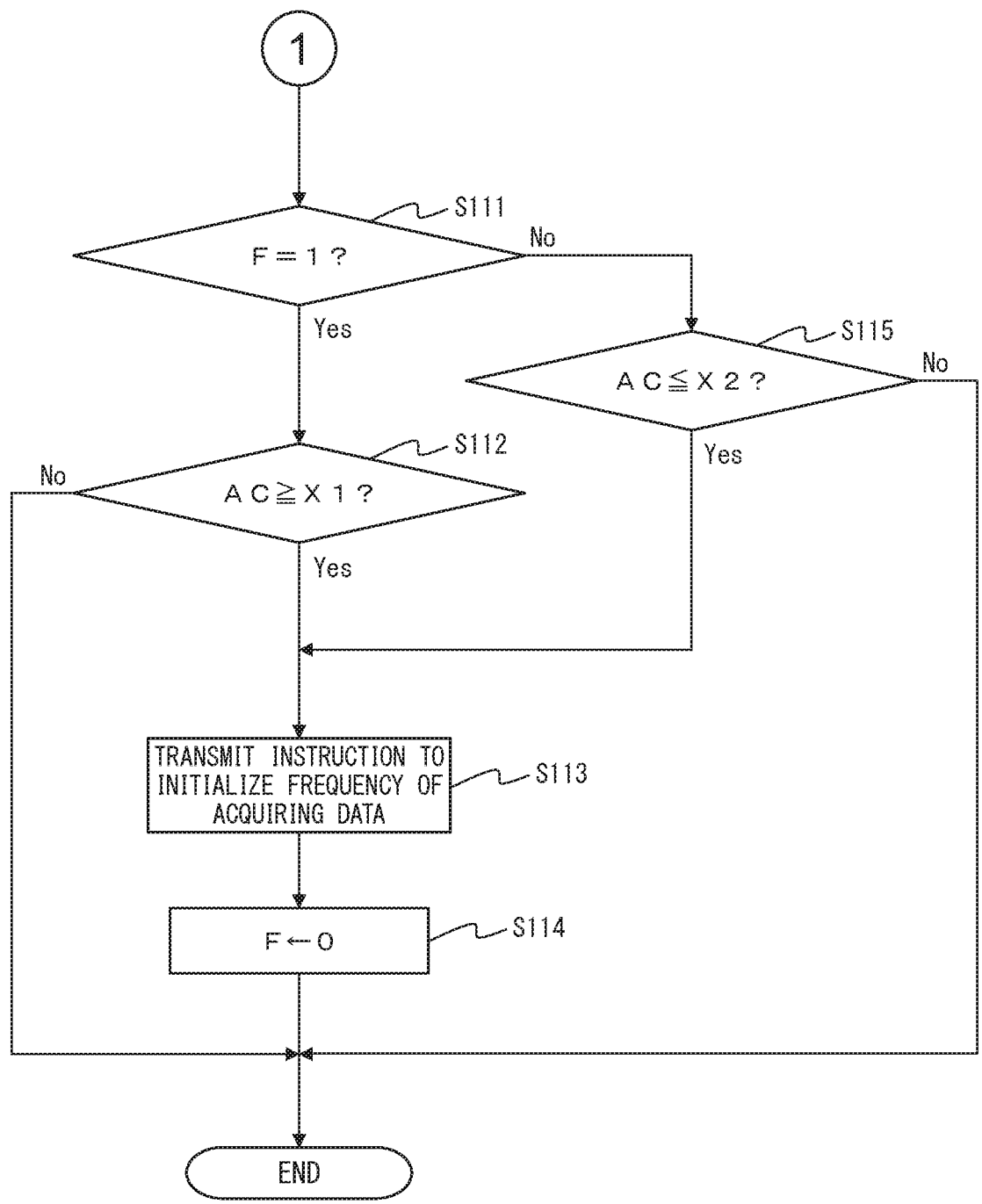
FIG. 6B is a flow chart showing control routines of the execution frequency transmitting process executed in the management servers in the first embodiment.

FIG. 6A and FIG. 6B are flowcharts showing control routines of the execution frequency transmitting process executed in the management server 1 according to the first embodiment. This control routine is repeatedly executed at a predetermined execution interval by the processor 14 of the management server 1.

First, in step S101, the training management unit 15 determines whether or not the accuracy acquisition unit 16 has received the accuracy AC of the machine learning model from the AI device 2. When it is determined that the accuracy acquisition unit 16 has not received the accuracy AC of the machine learning model, the control routine ends. On the other hand, when it is determined that the accuracy acquisition unit 16 has received the accuracy AC of the machine learning model, the control routine proceeds to step S102.

In step S102, the training management unit 15 identifies the AI device 2 that has transmitted the accuracy AC of the machine learning models. For example, the identification information (e.g., identification number) of the AI device 2 is transmitted from the AI device 2 to the management server 1 together with the accuracy AC of the machine learning models, and the training management unit 15 specifies the AI device 2 based on the identification information.

Next, in step S103, the training management unit 15 reads the stored values relating to the AI device 2 (hereinafter referred to as "target AI device 2") specified in step S102. Specifically, the training management unit 15 reads out the flag F related to the target AI device 2 as the stored value. Flag F is a flag representing the setting state of the data acquisition frequency, where the initial value of the flag F is zero. For example, a flag F for each of the plurality of AI devices 2 is stored in the storage device 12 of the management server 1 together with the identification information of the AI device 2.

Next, in step S104, the training management unit 15 determines whether or not the flag F is set to zero. When it is determined that the flag F is zero, that is, when the data acquisition frequency in the target AI device 2 is set to the initial value, the control routine proceeds to step S105.

In step S105, the training management unit 15 determines whether or not the accuracy AC of the machine learning model is equal to or less than a predetermined lower threshold THdw. The lower threshold THdw is determined in advance in view of the effectiveness of the machine learning models and the like. If it is determined that the accuracy AC of the machine learning model is equal to or less than the lower-threshold THdw, the control routine proceeds to step S106.

In step S106, the training management unit 15 transmits an instruction to increase the frequency of acquiring data to the target AI device 2. That is, the training management unit 15 instructs the target AI device 2 to increase the frequency of acquiring data. Next, in step S107, the training management unit 15 sets the flag F relating to the AI device 2 of the target AI to 1. After step S107, the control routine ends.

On the other hand, if it is determined in step S105 that the accuracy AC of the machine learning model is greater than the lower-threshold THdw, the control routine proceeds to step S108. In step S108, the training management unit 15 determines whether or not the accuracy AC of the machine learning models is equal to or greater than a predetermined upper threshold THup. The upper threshold THup is a value higher than the lower threshold THdw, and is determined in advance in view of the request accuracy of the machine learning model and the like. If it is determined that the accuracy AC of the machine learning model is equal to or greater than the upper threshold THup, the control routine proceeds to step S109.

In step S109, the training management unit 15 transmits an instruction to reduce the frequency of acquiring data to the target AI device 2. That is, the training management unit 15 instructs the target AI device 2 to reduce the frequency of acquiring data. Next, in step S110, the training management unit 15 sets the flag F relating to the AI device 2 of the target AI to 2. After step S110, the control routine ends.

When it is determined in step S108 that the accuracy AC of the machine learning model is lower than the upper threshold THup, that is, when the accuracy AC is between the lower threshold THdw and the upper threshold THup, the control routine ends. In this instance, the training management unit 15 may instruct the target AI device 2 to maintain the frequency of acquiring the data.

On the other hand, if it is determined in step S104 that the flag F is not zero, the control routine proceeds to step S111. In step S111, the training management unit 15 determines whether or not the flag F is 1. When it is determined that the flag F is 1, that is, when the frequency of acquiring data is increased in the target AI device 2, the control routine proceeds to step S112.

In step S112, the training management unit 15 determines whether or not the accuracy AC of the machine learning models is equal to or greater than a predetermined first determination value X1. The first determination value X1 is set to a value higher than the lower threshold THdw and lower than the upper threshold THup. For example, the first determination value X1 is set to a value higher than the lower threshold THdw by a predetermined value, and the predetermined value is set so that an increase in the frequency of acquiring data is not frequently repeated in the target AI device 2.

If it is determined in step S112 that the accuracy AC of the machine learning model is lower than the first determination value X1, the control routine ends. In this instance, the training management unit 15 may instruct the target AI device 2 to maintain the frequency of acquiring data at a high frequency.

On the other hand, if it is determined in step S112 that the accuracy AC of the machine learning model is equal to or greater than the first determination value X1, the control routine proceeds to step S113. In the step S113, the training management unit 15 transmits an instruction to initialize the data acquisition frequency to the target AI device 2. That is, the training management unit 15 instructs the target AI device 2 to initialize the frequency of acquiring data. Next, in step S114, the training management unit 15 resets the flag F for the target AI device 2 to zero. After step S114, the control routine ends.

On the other hand, when it is determined in step S111 that the flag F is 2, that is, when the frequency of acquiring data is reduced in the target AI device 2, the control routine proceeds to step S115. In step S115, the training management unit 15 determines whether or not the accuracy AC of the machine learning models is equal to or less than a predetermined second determination value X2. The second determination value X2 is set to a value lower than the upper threshold THup and higher than the lower threshold THdw. For example, the second determination value X2 is set to a value lower than the upper threshold THup by a predetermined value, and the predetermined value is determined so that the reduction of the frequency of acquiring data is not frequently repeated in the target AI device 2.

If it is determined in step S115 that the accuracy AC of the machine learning model is greater than the second determination value X2, the control routine ends. In this instance, the training management unit 15 may instruct the target AI device 2 to maintain the frequency of acquiring data at a low frequency.

On the other hand, if it is determined in step S115 that the accuracy AC of the machine learning model is equal to or less than the second determination value X2, the control routine proceeds to step S113. In step S113, the training management unit 15 transmits an instruction to initialize the data acquisition frequency to the target AI device 2. Next, in step S114, the training management unit 15 resets the flag F for the target AI device 2 to zero. After step S114, the control routine ends.

FIG. 7 is a flow chart showing control routines of the execution frequency changing process executed in the AI device 2. The control routine is executed in each of the plurality of AI devices 2 and is repeatedly executed at a predetermined execution interval by the processor 24 of the AI device 2.

First, in step S201, the data acquisition unit 25 determines whether or not an instruction to increase the data acquisition frequency is received from the management server 1. If it is determined that the instruction to increase the data acquisition frequency has been received, the control routine proceeds to step S202.

In step S202, the data acquisition unit 25 increases the data acquisition frequency and changes the data acquisition frequency to a predetermined value higher than the default value. For example, the data acquisition unit 25 shortens the acquisition interval of data by the sensor or the like, and increases the frequency of receiving data from the sensor or the like. As a result, the creation of the training data is promoted, and the creation speed of the training data is increased. After step S202, the control routine ends.

On the other hand, if it is determined in step S201 that an instruction to increase the frequency of acquiring data has not been received, the control routine proceeds to step S203.

In step S203, the data acquisition unit 25 determines whether or not an instruction to reduce the data acquisition frequency is received from the management server 1. If it is determined that the instruction to reduce the data acquisition frequency has been received, the control routine proceeds to step S204.

In step S204, the data acquisition unit 25 decreases the data acquisition frequency and changes the data acquisition frequency to a predetermined value lower than the default value. For example, the data acquisition unit 25 increases the acquisition interval of data by the sensor or the like, and decreases the frequency of receiving data from the sensor or the like. As a result, the creation of the training data is suppressed, and the creation speed of the training data becomes slow. After step S204, the control routine ends.

On the other hand, if it is determined in step S203 that the instruction to decrease the frequency of acquiring data has not been received, the control routine proceeds to step S205. In step S205, the data acquisition unit 25 determines whether or not an initialization instruction of the data acquisition frequency has been received from the management server 1. If it is determined that the data acquisition frequency initialization instruction has been received, the control routine proceeds to step S206.

In step S206, the data acquisition unit 25 initializes the data acquisition frequency and returns the data acquisition frequency to the initial value. After step S206, the control routine ends. On the other hand, when it is determined that the data acquisition frequency initialization instruction has not been received in the step S205, the data acquisition frequency in the AI device 2 is maintained, and the control routine ends.

In each of the plurality of AI devices 2, the initial value, the increased value and the decreased value of the frequency of acquiring data are determined in advance. Note that at least a part of these values may be different for each AI device 2

FIG. 8 is a flow chart showing control routines of the training process executed in the AI device 2. This control routine is executed in each of the plurality of AI devices 2 and is repeatedly executed by the processor 24 of the AI device 2.

First, in step S301, the training unit 26 determines whether or not the amount of training data newly created by the data acquisition unit 25 after the previous training is equal to or greater than a predetermined amount. If it is determined that the amount of training data is less than the predetermined amount, the control routine ends. On the other hand, when it is determined that the amount of training data is equal to or greater than the predetermined number, the control routine proceeds to step S302.

In step S302, the training unit 26 uses the newly created training data to train the machine learning model. For example, if the machine learning model is a neural network model, the training unit 26 updates predetermined parameters (weights and biases) of the machine learning model by a known error back-propagation method.

Next, in step S303, the accuracy calculation unit 27 calculates the accuracy of the machine learning model trained by the training unit 26. For example, when the machine learning model is a neural network model, the accuracy calculation unit 27 calculates the accuracy of the machine learning model by a known verification method such as a holdout method or a cross validation method. The test data used for the verification of the accuracy of the machine learning model is generated by the data acquisition unit 25 together with the training data. The test data may be provided to the AI device 2 from the outside of the AI device 2 (for example, the management server 1).

Next, in step S304, the accuracy calculation unit 27 transmits the accuracy of the machine learning model and the identification information of the AI device 2 to the management server 1. After step S304, the control routine ends.

Although the accuracy of the machine learning model is calculated immediately after training in the above processing, the accuracy of the machine learning model may be calculated at another timing. For example, the accuracy calculation unit 27 may calculate the accuracy of the machine learning model at predetermined intervals.

Further, the training management unit 15 of the management server 1 may change the training execution frequency instead of the data acquisition frequency as the execution frequency of the process relating to the training of the machine learning model. In this instance, for example, the training unit 26 of the AI device 2 trains the machine learning model at predetermined intervals, and the training management unit 15 instructs the target AI device 2 to increase or decrease these predetermined intervals.

Second Embodiment

The configuration and control of the model management system and the model management device according to the second embodiment are basically the same as the configuration and control of the model management system and the model management device according to the first embodiment, except for the following points. Therefore, the second embodiment of the present disclosure will be described below focusing on portions different from the first embodiment.

As described above, the training management unit 15 increases the execution frequency of process related to the training of the machine learning model having the accuracy of the predetermined lower threshold or less, and decreases the execution frequency of process related to the training of the machine learning model having the accuracy of the predetermined upper threshold or more. However, when the number of AI devices 2 for which the execution frequency is increased increases, the power consumption for training of the machine learning model increases, and when the number of AI devices 2 for which the execution frequency is decreased, the power consumption for training of the machine learning model decreases. Consequently, the power consumption in the target area in which a plurality of AI devices 2 are installed varies, and thus there is a possibility that a shortage of power supply, an increase of surplus power, etc. occurs. In particular, it is desirable to avoid unexpected fluctuations in power consumption as much as possible in target areas such as smart cities where power management is performed based on predictions of power demand and supply.

Therefore, in the second embodiment, the training management unit 15 changes at least one of the lower threshold and the upper threshold so that the change amount of the power consumption due to the change of the execution frequency of the process related to the training of the machine learning model is equal to or less than a predetermined value. This makes it possible to suppress variations in power consumption for training while suppressing variations in accuracy of machine learning models among a plurality of AI devices 2.

For example, when the number of AI devices 2 whose execution frequency is increased is larger than the number of AI devices 2 whose execution frequency is decreased, the training management unit 15 lowers the upper thresholds for at least some of the plurality of AI devices 2. This promotes a decrease in the execution frequency for the AI device 2 whose execution frequency has not been changed, so that the number of the AI devices 2 whose execution frequency has been decreased can be made close to the number of the AI devices 2 whose execution frequency has been increased. Therefore, it is possible to suppress the fluctuation of power consumption for training.

On the other hand, when the number of AI devices 2 whose execution frequency has been decreased is larger than the number of AI devices 2 whose execution frequency has been increased, the training management unit 15 raises the lower thresholds for at least some of the plurality of AI devices 2. This promotes an increase in the execution frequency for the AI devices 2 whose execution frequency has not been changed, so that the number of the AI devices 2 whose execution frequency has been increased can be made close to the number of the AI devices 2 whose execution frequency has been decreased. Therefore, it is possible to suppress the fluctuation of power consumption for training.

Figure 9A:
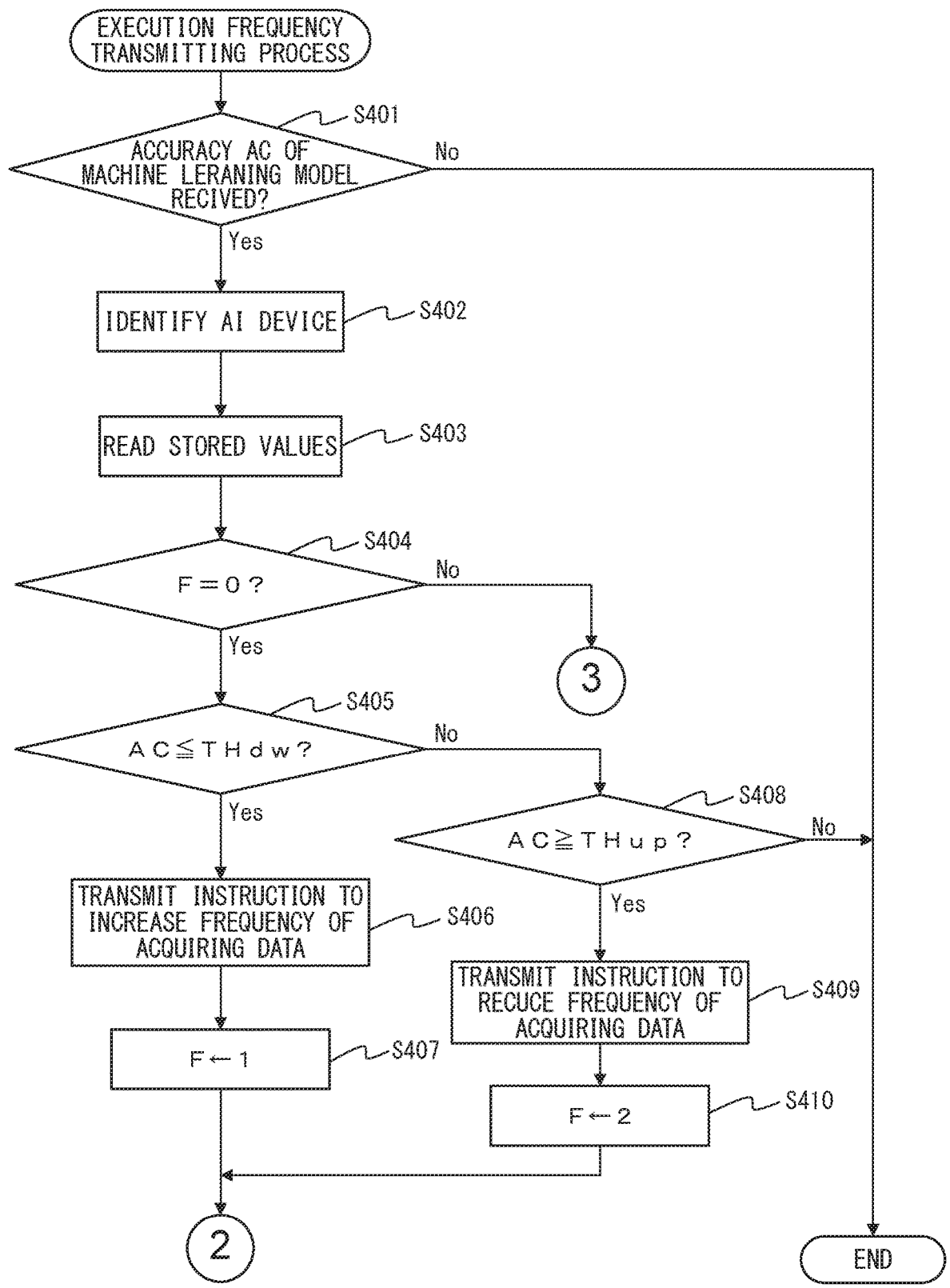
FIG. 9A is a flow chart showing control routines of the execution frequency transmitting process executed in the management server according to the second embodiment of the present disclosure.
Figure 9B:
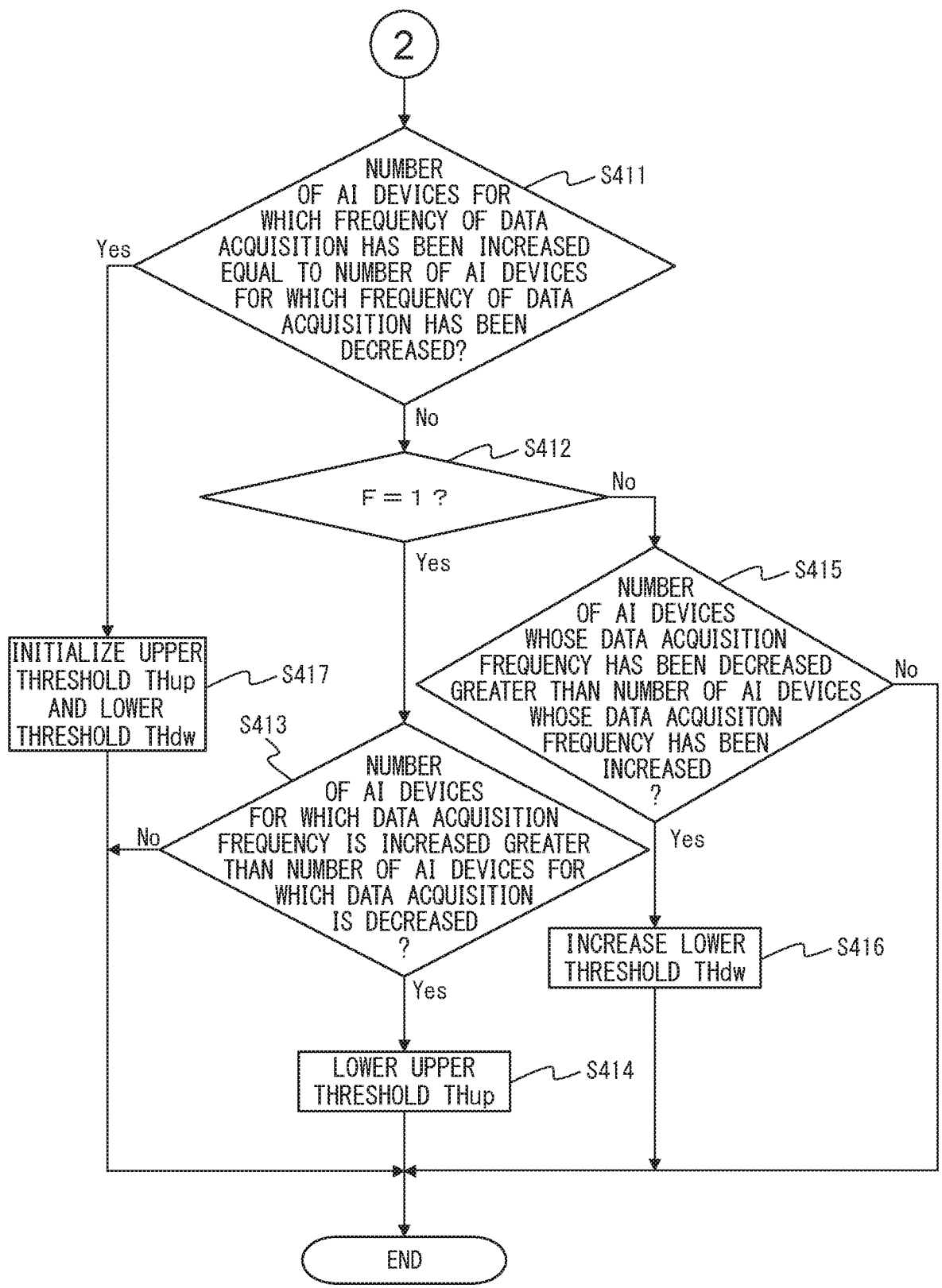
FIG. 9B is a flow chart showing control routines of the execution frequency transmitting process executed in the management server according to the second embodiment of the present disclosure.
Figure 9C:
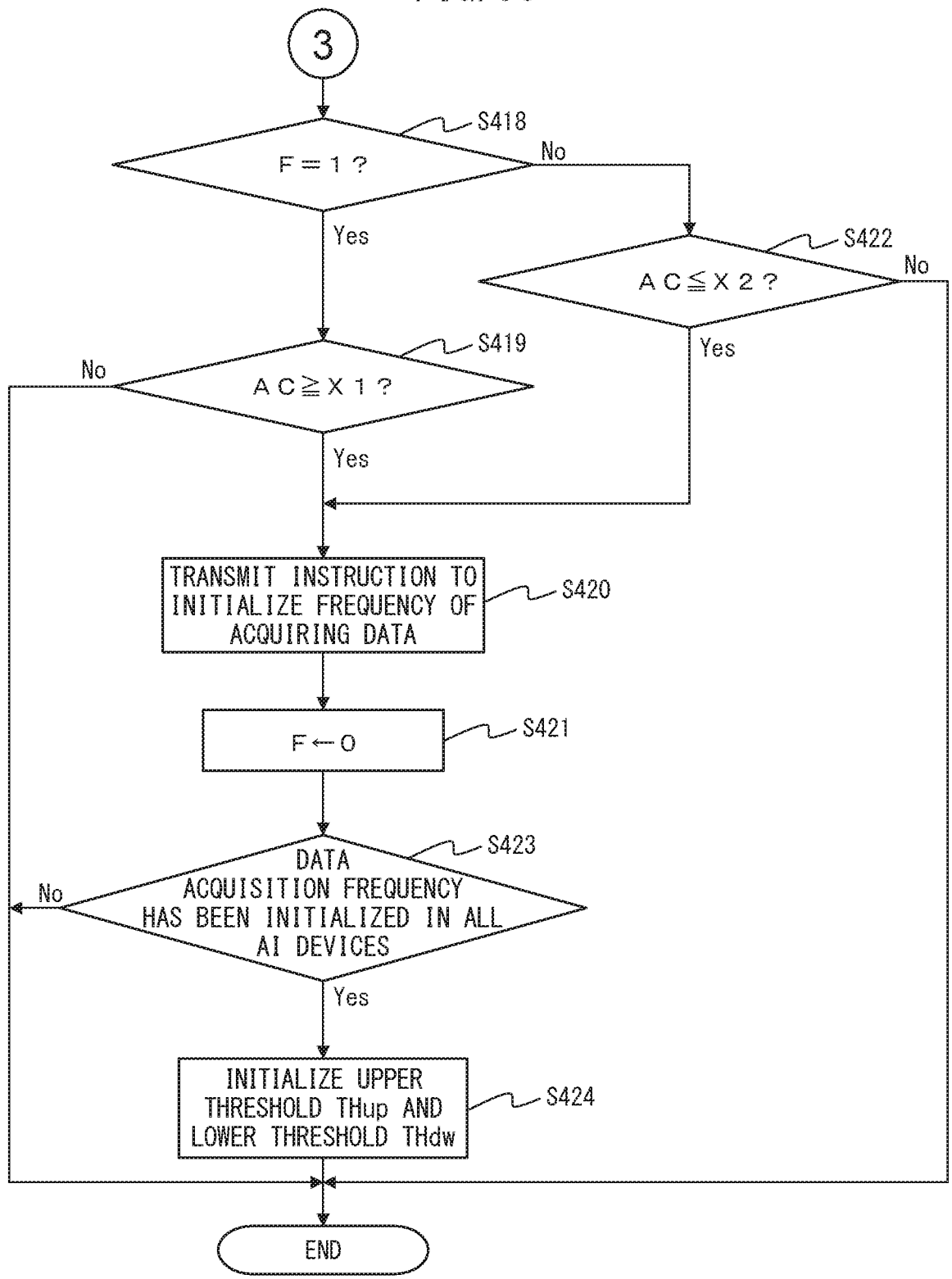
FIG. 9C is a flow chart showing control routines of the execution frequency transmitting process executed in the management server according to the second embodiment of the present disclosure.

FIG. 9A to FIG. 9C are flowcharts showing control routines of the execution frequency transmitting process executed in the management server 1 according to the second embodiment of the present disclosure. This control routine is repeatedly executed at a predetermined execution interval by the processor 14 of the management server 1.

The steps S401-S410 are executed in the same manner as the steps S101-S110 in FIG. 6A. In the example of FIG. 9A, in step S403, the training management unit 15 reads the flag F, the lower threshold THdw, and the upper threshold THup as stored values relating to the target AI device 2. In the second embodiment, since the lower threshold THdw and the upper threshold THup are changed in accordance with the change status of the data obtaining frequency, for example, the lower threshold THdw and the upper threshold THup relating to each of the plurality of AI devices 2 are stored in the storage device 12 of the management server 1 together with the identification information of the AI device 2.

After step S407 or step S410, the control routine proceeds to step S411. In step S411, the training management unit 15 determines whether or not the number of AI devices 2 for which the frequency of data acquisition has been increased is equal to the number of AI devices 2 for which the frequency of data acquisition has been decreased. That is, the training management unit 15 determines whether or not the number of AI devices 2 whose flag F is set to 1 is equal to the number of AI devices 2 whose flag F is set to 2. If it is determined that the number of AI devices 2 for which the data acquisition frequency has been increased is not equal to the number of AI devices 2 for which the data acquisition frequency has been decreased, the control routine proceeds to step S412.

In step S412, the training management unit 15 determines whether or not the flag F related to the target AI device 2 is set to 1. When it is determined that the flag F is set to 1, that is, when the data acquisition frequency is increased in the target AI device 2, the control routine proceeds to step S413.

In step S413, the training management unit 15 determines whether or not the number of AI devices 2 for which the data acquisition frequency is increased is greater than the number of AI devices 2 for which the data acquisition frequency is decreased. That is, the training management unit 15 determines whether or not the number of AI devices 2 whose flag F is set to 1 is greater than the number of AI devices 2 whose flag F is set to 2. If it is determined that the number of AI devices 2 for which the data acquisition frequency has been increased is equal to or less than the number of AI devices 2 for which the data acquisition frequency has been decreased, the control routine ends.

On the other hand, if it is determined in step S413 that the number of AI devices 2 for which the data acquisition frequency has been increased is greater than the number of AI devices 2 for which the data acquisition frequency has been decreased, the control routine proceeds to step S414. In step S414, the training management unit 15 lowers the upper threshold THup of the AI device 2 other than the target AI device 2. After step S414, the control routine ends. In step S414, the training management unit 15 may lower the upper threshold THup and the lower threshold THdw for the AI device 2 other than the target AI device 2. As a result, in addition to promoting a decrease in the frequency of data acquisition with respect to the AI device 2 other than the target AI device 2, it is possible to suppress an increase in the frequency of data acquisition. The AI device 2 in which the upper threshold THup or the upper threshold THup and the lower threshold THdw are lowered may be a part of the AI device 2 other than the target AI device 2.

On the other hand, if it is determined in step S412 that the flag F is set to 2, that is, when the frequency of acquiring data is reduced in the target AI device 2, the control routine proceeds to step S415. In step S415, the training management unit 15 determines whether or not the number of AI devices 2 whose data acquisition frequency has been decreased is greater than the number of AI devices 2 whose data acquisition frequency has been increased. That is, the training management unit 15 determines whether or not the number of AI devices 2 whose flag F is set to 2 is greater than the number of AI devices 2 whose flag F is set to 1. If it is determined that the number of AI devices 2 whose data acquisition frequency has been decreased is equal to or less than the number of AI devices 2 whose data acquisition frequency has been increased, the control routine ends.

On the other hand, if it is determined in step S415 that the number of AI devices 2 whose data acquisition frequency has been decreased is greater than the number of AI devices 2 whose data acquisition frequency has been increased, the control routine proceeds to step S416. In step S416, the training management unit 15 increases the lower threshold THdw of the AI device 2 other than the target AI device 2. After step S416, the control routine ends. In step S416, the training management unit 15 may increase the lower threshold THdw and the upper threshold THup for the AI device 2 other than the target AI device 2. As a result, in addition to promoting an increase in the frequency of data acquisition with respect to the AI device 2 other than the target AI device 2, it is possible to suppress a decrease in the frequency of data acquisition. The AI device 2 in which the lower threshold THdw or the lower threshold THdw and the upper threshold THup are increased may be a part of the AI device 2 other than the target AI device 2.

On the other hand, if it is determined in step S411 that the number of AI devices 2 for which the data acquisition frequency has been increased is equal to the number of AI devices 2 for which the data acquisition frequency has been decreased, the control routine proceeds to step S417. In step S417, the training management unit 15 initializes the upper threshold THup and the lower threshold THdw for all the AI devices 2. That is, the training management unit 15 returns the upper threshold THup and the lower threshold THdw for all the AI devices 2 to the default values. After step S417, the control routine ends.

On the other hand, if the flag F in step S404 is determined not to be zero, the control routine proceeds to step S418. Step S418-S422 are performed in the same manner as step S111-S115 in FIG. 6B, and after step S421, the control routine proceeds to step S423.

In the step S423, the training management unit 15 determines whether or not the data acquisition frequency has been initialized in all the AI devices 2. That is, the training management unit 15 determines whether or not the flags F related to all the AI device 2 are set to zero. If it is determined that at least some of the AI devices 2 have not initialized the frequency at which data is acquired, this control routine terminates. On the other hand, if it is determined that the data acquisition frequency has been initialized in all the AI device 2, the control routine proceeds to step S424.

In step S424, the training management unit 15 initializes the upper threshold THup and the lower threshold THdw for all the AI devices 2. That is, the training management unit 15 returns the upper threshold THup and the lower threshold THdw for all the AI device 2 to the default values. After step S424, the control routine ends.

In the second embodiment, similarly to the first embodiment, the control routine of the execution frequency changing process of FIG. 7 and the control routine of the training process of FIG. 8 are executed in each of the plurality of AI devices 2.

Third Embodiment

The configuration and control of the model management system and the model management device according to the third embodiment are basically the same as the configuration and control of the model management system and the model management device according to the first embodiment, except for the following points. Therefore, the third embodiment of the present disclosure will be described below focusing on portions different from the first embodiment.

Figure 10:
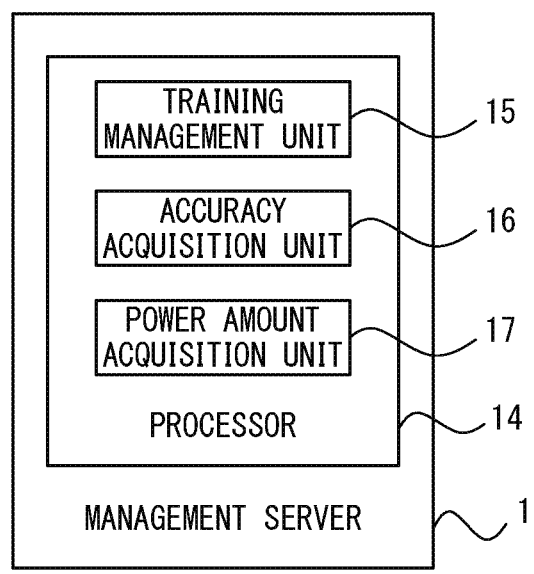
FIG. 10 is a functional block diagram of a processor of the management server according to the third embodiment.

FIG. 10 is a functional block diagram of the processor 14 of the management server 1 according to the third embodiment. In the third embodiment, the processor 14 includes a power amount acquisition unit 17 in addition to the training management unit 15 and the accuracy acquisition unit 16. The training management unit 15, the accuracy acquisition unit 16, and the power amount acquisition unit 17 are functional modules realized by the processor 14 of the management server 1 executing computer programs stored in the storage device 12 of the management server 1. Each of these functional modules may be realized by a dedicated arithmetic circuit provided in the processor 14.

As described above, the training management unit 15 increases the execution frequency of the process related to the training of the machine learning model having the accuracy of the predetermined lower threshold or less, and decreases the execution frequency of the process related to the training of the machine learning model having the accuracy of the predetermined upper threshold or more. However, due to fluctuations in the power demand in the target areas where the plurality of AI devices 2 are installed, it is not always possible to use a constant power quantity for training the machine learning models in the plurality of AI devices 2.

Therefore, in the third embodiment, the power amount acquisition unit 17 acquires the power amount that can be supplied to the plurality of AI devices 2, and the training management unit 15 changes at least one of the upper threshold and the lower threshold based on the power amount acquired by the power amount acquisition unit 17. Thus, the execution frequency of the process related to the training of the machine learning model in the plurality of AI devices 2 can be brought close to a value corresponding to the desired power consumption, and it is possible to suppress the shortage of power for learning or the generation of surplus power.

Figure 11:
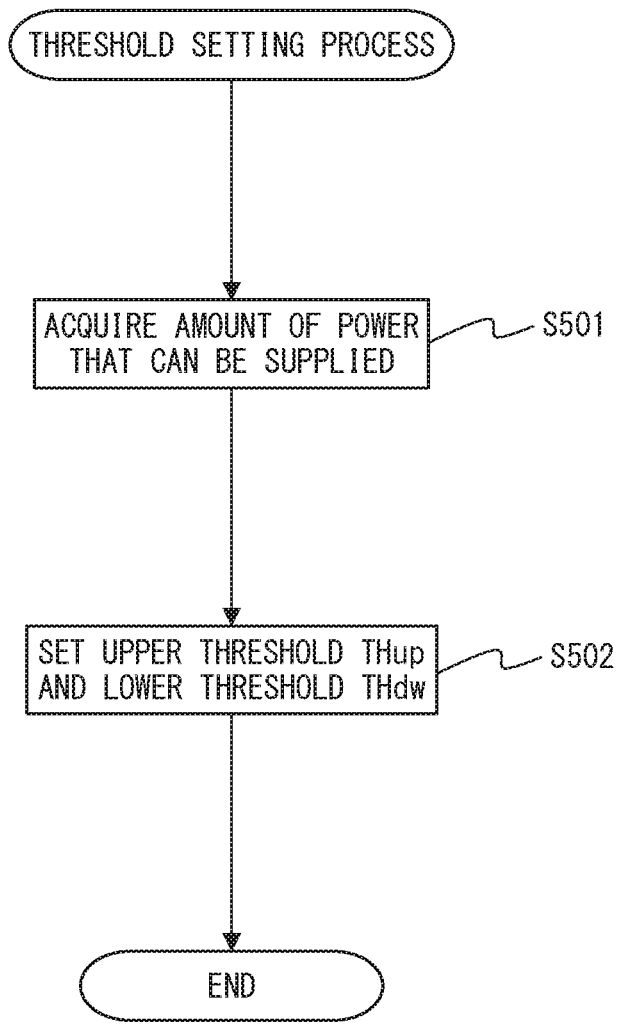
FIG. 11 is a flowchart showing a control routine of the threshold setting process executed in the management server in the third embodiment.

FIG. 11 is a flowchart showing a control routine of the threshold setting process executed in the management server 1 in the third embodiment. This control routine is repeatedly executed at a predetermined execution interval by the processor 14 of the management server 1.

First, in the step S501, the power amount acquisition unit 17 acquires the electric energy that can be supplied to the plurality of AI devices 2 (all of the AI devices 2 installed in the target area and managed by the management server 1). For example, the power amount acquisition unit 17 calculates the amount of power that can be supplied to the plurality of AI devices 2 based on the predicted amount of power demand and power supply in the target area. The larger the value obtained by subtracting the predicted value of electric power demand from the predicted value of electric power supply, the more electric power that can be supplied to a plurality of AI devices 2.

The predicted values of the electric power demand amount and the electric power supply amount are, for example, transmitted from an electric power company or the like to the management server 1, input to the management server 1 by an operator, calculated from past actual values of the electric power demand amount and the electric power supply amount, or calculated from a predetermined input parameter using an estimator such as a machine learning model.

Next, in step S502, the training management unit 15 sets the upper threshold THup and the lower threshold THdw based on the electric energy acquired in step S501. The upper threshold THup and the lower threshold THdw set by the training management unit 15 are stored in the storage device 12 of the management server 1.

Figure 12:
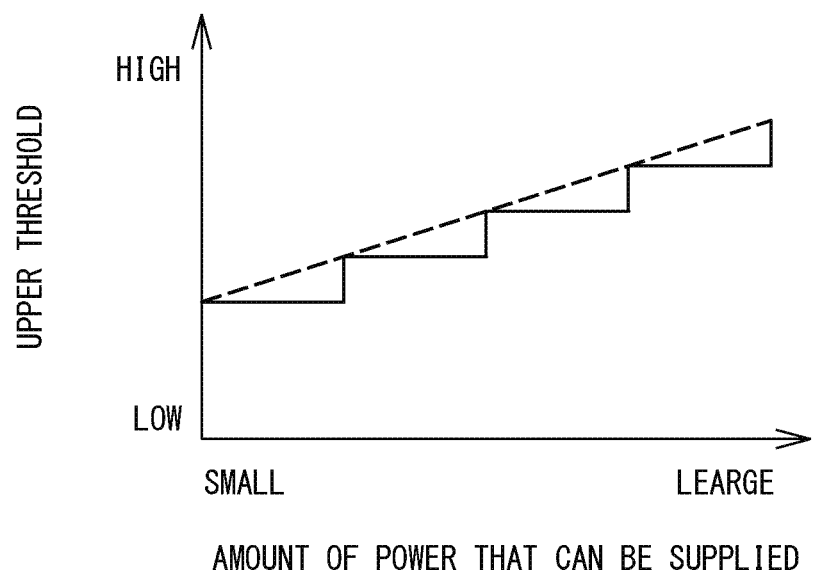
FIG. 12 is a diagram illustrating a relation between an amount of power that can be supplied to a plurality of AI devices and an upper threshold.
Figure 13:
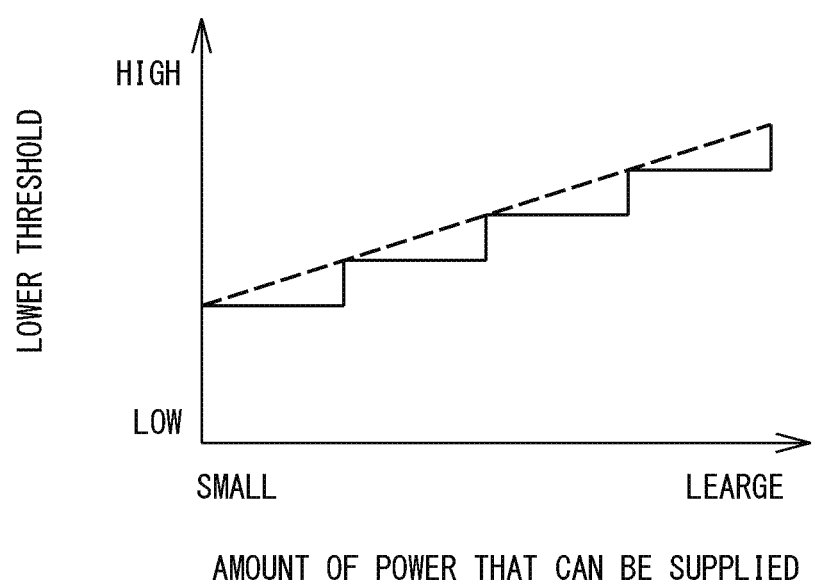
FIG. 13 is a diagram illustrating the relation between the amount of power that can be supplied to the plurality of AI devices and the lower threshold.

For example, the training management unit 15 sets the upper threshold THup and the lower threshold THdw using the maps shown in FIGS. 12 and 13. FIG. 12 is a diagram illustrating the relation between the amount of power that can be supplied to the plurality of AI devices 2 and the upper threshold THup. For example, as shown by a solid line in FIG. 12, the training management unit 15 increases the upper threshold THup stepwise as the amount of electric power that can be supplied increases. As indicated by a broken line in FIG. 12, the training management unit 15 may linearly increase the upper threshold THup as the amount of electric power that can be supplied increases.

FIG. 13 is a diagram showing the relation between the amounts of electric power that can be supplied to the plurality of AI devices 2 and the lower threshold THdw. For example, as illustrated by a solid line in FIG. 13, the training management unit 15 increases the lower threshold THdw stepwise as the amount of power that can be supplied increases. Incidentally, as shown by a broken line in FIG. 13, the training management unit 15 may linearly increase the lower threshold THdw as the amount of power that can be supplied increases.

The training management unit 15 may change only one of the upper threshold THup and the lower threshold THdw based on the amount of power that can be supplied to the plurality of AI devices 2. Also, different maps may be used for each AI device 2, and the upper threshold THup and the lower threshold THdw may be set to different values among the plurality of AI devices 2. After step S502, the control routine ends.

Also in the third embodiment, the control routines of the execution frequency transmitting process of the diagrams 6A and 6B are executed in the management server 1. In the example of FIG. 6A, in step S103, the training management unit 15 reads out the flag F, the lower threshold THdw, and the upper threshold THup as stored values relating to the target AI device 2. Also in the third embodiment, similarly to the first embodiment, the control routine of the execution frequency changing process of FIG. 7 and the control routine of the training process of FIG. 8 are executed in each of the plurality of AI devices 2.

Other Embodiments

While preferred embodiments of the present disclosure have been described above, the present disclosure is not limited to these embodiments, and various modifications and changes may be made within the scope of the appended claims. For example, the machine learning model in which training is performed in each of the plurality of AI devices 2 may be a machine learning model other than a neural network such as a random forest, a k-neighborhood method, a support vector machine, or the like.

Also, when the machine learning model to be trained in AI device 2 is concerned with human health, it is desirable to maintain the accuracy of the machine learning model as high as possible. For this reason, the training management unit 15 may reduce the execution frequency of the process related to the training of the machine learning model which has an accuracy equal to or higher than a predetermined upper threshold and which does not output data related to human health. That is, even if the accuracy of the machine learning model for outputting data relating to human health is equal to or greater than a predetermined upper threshold, the execution frequency of the process relating to training of the machine learning model may be maintained at an initial value. This makes it possible to maintain high prediction accuracy of data on human health. The data relating to the health of the person are, for example, the probability of suffering from a given disease, the health level of the person, etc.

Further, information (weights, biases, etc.) of the machine learning model trained in the AI device 2 may be transmitted from the AI device 2 to the management server 1, and the accuracy acquisition unit 16 of the management server 1 may calculate the accuracy of the machine learning model instead of the accuracy calculation unit 27 of the AI device 2.

The invention claimed is:

1. A model management device for managing a plurality of machine learning models, comprising:
a communication unit capable of communicating with a plurality of AI devices, each of which continuously performs training of a machine learning model; and
a processor configured to manage training of the machine learning model in each of the plurality of AI devices, acquire an accuracy of the machine learning model trained in each of the plurality of AI devices, and acquire an amount of power that can be supplied to the plurality of AI devices, wherein
the processor is configured to change an execution frequency of acquiring data relating to training of the machine learning model having the accuracy within a predetermined range, based on the amount of power.

2. The model management device as claimed in claim 1, wherein the processor is configured to increase the execution frequency of acquiring the data related to training of the machine learning model having the accuracy equal to or less than a predetermined lower threshold.

3. The model management device as claimed in claim 2, wherein the processor is configured to restore the execution frequency to an original value when the accuracy of the machine learning model rises to a predetermined first determination value higher than the lower threshold due to the increase in the execution frequency.

4. The model management device as claimed in claim 1, wherein the processor is configured to reduce the execution frequency of acquiring the data related to training of the machine learning model having the accuracy equal to or higher than a predetermined upper threshold.

5. The model management device as claimed in claim 4, wherein the processor is configured to restore the execution frequency to an original value when the accuracy of the machine learning model drops to a predetermined second determination value less than the upper threshold due to the reduction of the execution frequency.

6. The model management device as claimed in claim 1, wherein the processor is configured to increase the execution frequency of acquiring the data related to training of the machine learning model having the accuracy equal to or less than a predetermined lower threshold, decrease the execution frequency of acquiring the data related to training of the machine learning model having the accuracy equal to or higher than a predetermined upper threshold, and change at least one of the upper threshold and the lower threshold based on the amount of power.

7. The model management device as claimed in claim 4, wherein the machine learning model having the accuracy equal to or higher than the upper threshold is a machine learning model that does not output data related to human health.

8. A model management method for managing a plurality of machine learning models using a model management device, comprising:
acquiring an accuracy of a machine learning model trained in each of a plurality of AI devices;
acquiring an amount of power that can be supplied to the plurality of AI devices; and
changing an execution frequency of acquiring data related to training of the machine learning model having the accuracy within a predetermined range based on the amount of power.

9. A model management device for managing a plurality of machine learning models, comprising:
a communication unit capable of communicating with a plurality of AI devices, each of which continuously performs training of a machine learning model; and
a processor configured to manage training of the machine learning model in each of the plurality of AI devices, and acquire an accuracy of the machine learning model trained in each of the plurality of AI devices, wherein
the processor is configured to increase an execution frequency of acquiring data related to training of the machine learning model having the accuracy equal to or lower than a predetermined lower threshold, decrease the execution frequency of acquiring the data related to training of the machine learning model having the accuracy equal to or higher than a predetermined upper threshold, and change at least one of the lower threshold and the upper threshold so that a change amount of a power consumption amount due to the change of the execution frequency is equal to or less than a predetermined value.

10. A model management method for managing a plurality of machine learning models using a model management device, comprising:

acquiring an accuracy of a machine learning model trained in each of a plurality of AI devices; and increasing an execution frequency of acquiring data related to training of the machine learning model having the accuracy equal to or lower than a predetermined lower threshold, decreasing the execution frequency of acquiring the data related to training of the machine learning model having the accuracy equal to or higher than a predetermined upper threshold, and changing at least one of the lower threshold and the upper threshold so that a change amount of a power consumption amount due to the change of the execution frequency is equal to or less than a predetermined value.

* * * * *